United States Patent [19]
Oles

[11] Patent Number: 6,042,120
[45] Date of Patent: Mar. 28, 2000

[54] CONTROLLED FREEZE SEAL FOR PIPES

[75] Inventor: Christopher J. Oles, Atascadero, Calif.

[73] Assignee: Jeffrey E. Bonner, Grover Beach, Calif.

[21] Appl. No.: 08/978,119

[22] Filed: Nov. 25, 1997

Related U.S. Application Data

[60] Provisional application No. 60/032,189, Nov. 29, 1996.

[51] Int. Cl.[7] .................................................. E03B 7/10
[52] U.S. Cl. ........................ 277/602; 277/627; 277/650; 138/32; 138/34; 374/135; 374/138
[58] Field of Search ..................................... 277/314, 316, 277/933, 602, 627, 630, 650; 138/32, 34; 374/135, 138, 174

[56] References Cited

U.S. PATENT DOCUMENTS

| | | | |
|---|---|---|---|
| 3,498,071 | 3/1970 | Tremont | 62/66 |
| 3,943,722 | 3/1976 | Ross | 62/260 |
| 4,267,699 | 5/1981 | Bahrenbug | 62/66 |

*Primary Examiner*—Anthony Knight
*Assistant Examiner*—Alison K. Pickard
*Attorney, Agent, or Firm*—Daniel C. McKown

[57] ABSTRACT

Instead of applying the maximum cooling effect that can be produced, the method and apparatus disclosed applies only a carefully controlled cooling that is adequate to maintain the fluid in the pipe in a frozen condition but which maintains the temperature high enough to prevent damage to the metallurgical structure of the pipe. At the same time, the apparatus creates permanent documentation of the temperatures at selected stations along the pipe throughout the process, thereby providing proof that the pipe sustained no thermal damage.

4 Claims, 1 Drawing Sheet

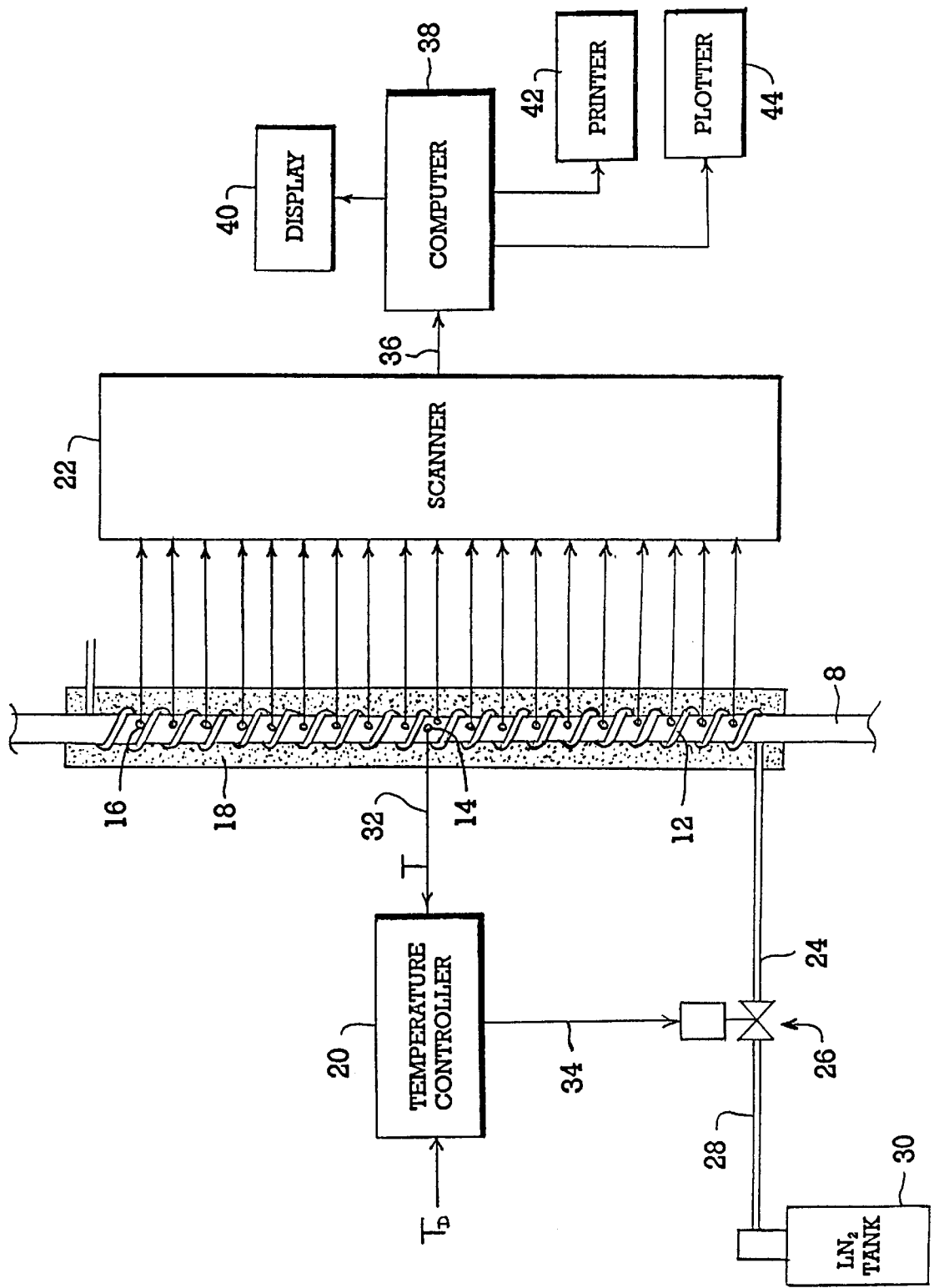

CONTROLLED FREEZE SEAL FOR PIPES

REFERENCE TO RELATED APPLICATION

This application claims the benefit of U.S. Provisional Application No. 60/032,189 filed Nov. 29, 1996.

BACKGROUND OF THE INVENTION

1. Field of the Invention

The present invention is in the field of industrial piping and more specifically relates to an apparatus and method for producing a controlled freeze seal within a pipe for the purpose of interrupting the flow of fluid through the pipe to permit repairs or maintenance to be performed downstream of the freeze seal.

2. The Prior Art

Freeze seals have historically been used in power generation plants, shipboard steam propulsion power plants, refineries, and other industrial applications. Typically, a section of pipe was enclosed in a bag which was then filled with solid carbon dioxide. If a lower temperature was required, a copper tube was wrapped around the pipe and liquid nitrogen was allowed to flow through the tube. No effort was made in these prior art techniques to control the temperature to any specific level. Eventually the pipe temperature approached the temperature of the cooling medium. It was thought that a sufficient plug was formed when a frost line was observed extending approximately one inch beyond the copper cooling tube.

In these prior art methods, no attempt was made to monitor the temperature of the pipe wall within the area covered by the wrapped copper tube, and no permanent records were made of the temperatures reached.

Recently there has been a growing appreciation of the fact that such drastic cooling to an unnecessarily low temperature results in damage to the metallurgical structure of the pipe, causing a weak spot in the pipe wall. Such weak spots have a potential for breaking catastrophically.

Confronted by this more recent appreciation of the hazards that can result from overcooling of pipes, the present inventors embarked on an effort to find a way of producing a freeze seal without overcooling the pipe.

SUMMARY OF THE INVENTION

In accordance with the present invention, temperature sensors are spaced at intervals along the cooled portion of the pipe. These temperature sensors are monitored continuously and the indicated temperatures are plotted on a chart, whereby documentation is produced that shows the temperature along the pipe throughout the entire cooling cycle.

Further, in accordance with the present invention, the output of one of the temperature sensors is applied to a control system that maintains the measured temperature within tight limits by controlling the flow of coolant through the wrapped copper tube. If the measured temperature rises above the desired temperature, an electrically-controlled valve is opened to start or to increase the flow of coolant. On the other hand, if the measured temperature falls below the desired temperature, the valve is closed to stop or to diminish the flow of coolant through the copper tube.

The novel features which are believed to be characteristic of the invention, both as to organization and method of operation, together with further objects and advantages thereof, will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

The drawing is a diagram showing the apparatus used in a preferred embodiment of the present invention.

DETAILED DESCRIPTION OF THE PREFERRED EMBODIMENT

Referring now to the drawing, the pipe 8 to be temporarily sealed is first wrapped with copper tubing 12 that extends in a helical configuration along the outside surface of the pipe 8. The successive turns of the copper tubing may be spaced from each other. In one of the spaces between the successive turns, a control thermocouple 14 is attached to the pipe 8 by use of a clamp to assure good thermal contact. The control thermocouple 14 is connected electrically to the temperature controller 20. A chosen number of additional thermocouples, of which the thermocouple 16 is typical, are spaced along the pipe 8 and fastened to it so as to be in good thermal contact with the pipe 8. These thermocouples are electrically connected to the thermocouple scanner 22.

Preferably, the pipe 8 is then surrounded by an insulative blanket 18 which serves to prevent atmospheric moisture or gases from condensing on the parts to be cooled. The insulative blanket 18 further serves to prevent heat from the surrounding air from warming the parts that are to be cooled.

One end 24 of the copper tubing is connected to an electrically-actuated valve 26, and the other end of the copper tube 12 is permitted to vent into the atmosphere.

The cooling fluid, liquid nitrogen in the present example, is conducted under pressure through the tube 28 from a liquid nitrogen tank 30 to the electrically-actuated valve 26. The latter controls the flow of coolant through the copper tube 12 under control of the temperature controller 20. A desired temperature $T_D$ is preset into the temperature controller 20 by the user. The desired temperature $T_D$ is low enough to maintain the fluid in the pipe 8 in a frozen condition and high enough to prevent unnecessary damage to the metallurgical structure of the pipe 8.

In a simple embodiment, the valve 26 is either fully open when the actual temperature T is greater than the desired temperature $T_D$, or is completely closed when the actual temperature T is less than the desired temperature $T_D$. This type of control system is typical of the thermostat controlled heating systems widely used in homes, and the principal disadvantage is that it is subject to overshooting.

In a more refined embodiment, the flow through the valve 26 can be controlled in a more continuous manner, and in this embodiment, the temperature controller generates an error signal that is proportional to the difference between the actual temperature T and the desired temperature $T_D$, and applies this control signal to the valve 26 which increases or decreases the flow of coolant accordingly.

The electrical signals produced by the thermocouples 16 are applied to the thermocouple scanner 22. The scanner 22 includes provisions for initially equalizing the outputs of the thermocouples 16 so that the outputs are all equal initially when the pipe 8 is at a known temperature. This calibration can be performed by the use of a potentiometer for each of the thermocouples. The scanner also includes amplifiers for amplifying the equalized signals to a level that is compatible with the downstream electrical components. Finally, the scanner includes demultiplexing circuitry that successively applies the signals from the various therm ocouples to the computer via the conductor 36.

The computer 38 includes provision for storing the demultiplexed signal on the conductor 36, for adapting that signal for use by the display 40, the printer 42, and the plotter 44, and for controlling the display, printer, and plotter in response to manual inputs by the user.

The display 40 permits the user to view a temperature profile along the cooled portion of the pipe 8 in real time. The printer 42 and the plotter 44 provide documentation in a permanent form showing the date, the hour of the day, and the temperature at each station along the pipe 8. Such documentation was not provided by prior art systems and therefore there was no way of being certain that the pipe 8 had not been damaged by cooling to excessively low temperatures.

Thus, there has been described apparatus and a method for freeze sealing a pipe in such a way that the pipe is not subjected to unnecessarily low temperatures, and in which the entire cooling cycle is documented.

I claim:

1. Apparatus for producing a controlled freeze seal in a fluid-filled pipe, comprising:

a reservoir of a coolant;

a tube connected to said reservoir and extending along the pipe in contact with it;

a valve inserted into said tube between said reservoir and the pipe for controlling the flow of coolant through said tube;

a temperature sensor in thermal contact with the pipe at the location of the seal for sensing the temperature T of the pipe at the seal;

a temperature controller connected to said valve and to said temperature sensor, and responsive to the sensed temperature T and to a preset desired temperature $T_D$ for controlling the flow of coolant through said tube, where $T_D$ is a temperature that is low enough to maintain the fluid in the pipe in a frozen condition and high enough to prevent damage to the metallurgical structure of the pipe.

2. The apparatus of claim 1 wherein when T is greater than $T_D$ said controller maintains said valve in a fully open condition and when T is less than $T_D$ said controller maintains said valve in a closed condition.

3. The apparatus of claim 1 wherein said controller adjusts said valve in relation to the difference between T and $T_D$.

4. The apparatus of claim 1 further comprising:

a plurality of temperature sensors spaced along the pipe in the vicinity of the freeze seal; and, means connected to said plurality of temperature sensors for producing documentation showing the temperature sensed by each of said plurality of temperature sensors as a function of time during the production and maintenance of the freeze seal.

* * * * *